R. J. SCHULTZ.
FILTERING DEVICE.
APPLICATION FILED DEC. 21, 1908.

970,650.

Patented Sept. 20, 1910.

Witnesses
Albert L. Key
M. Gillis

Inventor
Reinhard J. Schultz,
By Chandler & Chandler
Attorney

UNITED STATES PATENT OFFICE.

REINHARD J. SCHULTZ, OF ARCO, MINNESOTA.

FILTERING DEVICE.

970,650.     Specification of Letters Patent.     Patented Sept. 20, 1910.

Application filed December 21, 1908. Serial No. 468,649.

*To all whom it may concern:*

Be it known that I, REINHARD J. SCHULTZ, a citizen of the United States, residing at Arco, in the county of Lincoln, State of Minnesota, have invented certain new and useful Improvements in Filtering Devices; and I do hereby declare the following to be a full, clear, and exact description of the invention, such as will enable others skilled in the art to which it appertains to make and use the same.

This invention relates to filters and more especially to a type of filter adapted to be used in connection with traction engines to filter the water used in the boilers thereof.

It is a well known fact that traction engines are compelled to use water which frequently contains such impurities as lime, sand and the like.

One object of this invention is the provision of a novel form of filter and pipe connections therefor which will remove foreign matter suspended in the water and which may be readily attached to any form of traction engine operated by steam.

Another object of the invention is to provide a novel arrangement of pipes leading to the filter whereby the water may be heated before being carried into the boiler.

A third object of the invention is to provide an arrangement of pipes whereby the filters may be blown out.

With the above and other objects in view, the invention consists, in general, of a pair of filters of peculiar construction together with a novel piping arrangement therefor.

The invention further consists in certain novel details of construction and combinations of parts hereinafter fully described, illustrated in the accompanying drawings, and specifically set forth in the claim.

Figure 1:
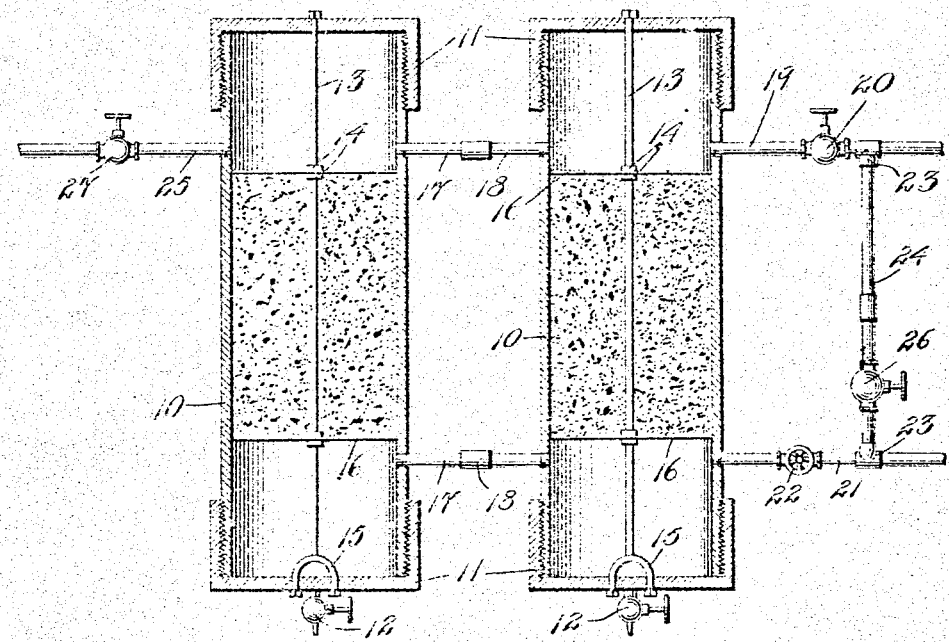
Figure 2:
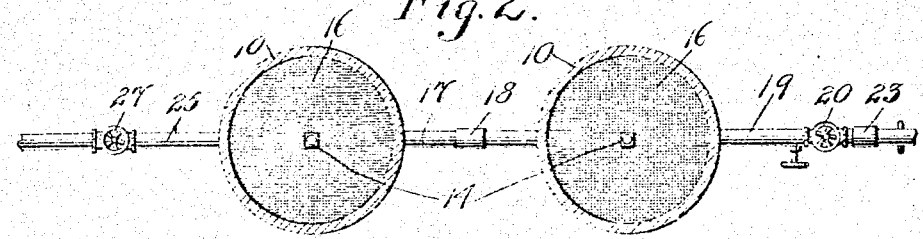

In the accompanying drawings, like characters of reference indicate like parts in the several views, and:—Figure 1 is a vertical longitudinal section through the entire structure. Fig. 2 is a horizontal section through the entire structure.

This invention comprises a pair of filters the bodies of which are indicated by the numeral 10. These filter bodies are made of pipe of sufficient thickness to withstand the pressure of the steam and water and upon each end of each is mounted a suitable cap 11. Centrally located on the lower cap 11 are blow-off cocks 12 which may be of any precise construction.

Held within the bodies 10 by means of suitable rods 13 provided with nuts 14 and having forked lower ends 15 are a pair of spaced perforated filter plates 16. The space between the filter plates of each pair is filled with a mixture of charcoal and medium coarse sand closely packed in. Each of the body portions 10 is connected above and below the upper and lower plates 16 by means of pipes 17 provided with unions 18.

Leading into one of the filters above the upper filter plate is a steam pipe 19 provided with a valve 20 of any desired form. Below the lower filter plate 16 of the same filter chamber is a water supply pipe 21 provided with a valve 22. At 23 are shown a pair of tees; one being in the pipe 19 and the other in the pipe 21, and these tees are connected by means of a pipe 24. Extending out from the other filter chamber and above the upper filter plate 16 is a boiler supply pipe 25.

In the operation of the device, water is admitted below the lower filter plate 16 through the pipe 21 by opening the valve 22. This water then passes up through the filtering material in each of the filters and flows out through the pipe 25. In case it be desired to heat the water the valve 20 is opened and live steam is admitted into the space above the upper filter plate so that the clean water is heated thereby. When it becomes necessary to clean the filters the valve 22 is closed and the valves 20 and 12 opened so that the steam passes into the upper end of the respective filters and then downward and out the valve 12 carrying with it all the foreign matter which may have accumulated in the filtering material. For the purpose of cutting off communication between the parts 19 and 21 when desired, a valve 26 is held in the pipe 24 and for the purpose of cutting off communication between filters and the boiler while the same are being cleansed, a valve 27 is held in the pipe 25.

Having thus described the invention what is claimed as new, is:—

A filter comprising a cylindrical terminally threaded body, a head screwed on to each end of the body, a blow-off valve centrally disposed in one of the heads, a rod having one end passed centrally through the opposite head and having a nut engaged therewith exteriorly of the head, the opposite end of the rod being forked and having the resultant members passed through the first named head at opposite sides of the blow-off valve and provided with terminal nuts, a pair of perforated filter plates disposed upon the rod within the body, one adjacent to each end of the latter, a nut engaged with the rod at each side of each filter plate and in contact therewith, a filtering bed between the plates and ingress and egress pipes connected with the body between the plates and the heads.

In testimony whereof, I affix my signature, in presence of two witnesses.

REINHARD J. SCHULTZ.

Witnesses:
 CHARLES REIN,
 L. P. SISSON.